(12) United States Patent
Matsushita

(10) Patent No.: US 10,100,177 B2
(45) Date of Patent: Oct. 16, 2018

(54) FOAMED PRODUCT

(71) Applicant: KANKYOKEIEISOGOKENKYUSHO CO., INC., Tokyo (JP)

(72) Inventor: Takamichi Matsushita, Tokyo (JP)

(73) Assignee: KANKYOKEIEISOGOKENKYUSHO CO., INC., Tokyo (JP)

(*) Notice: Subject to any disclaimer, the term of this patent is extended or adjusted under 35 U.S.C. 154(b) by 106 days.

(21) Appl. No.: 15/300,927

(22) PCT Filed: May 29, 2015

(86) PCT No.: PCT/JP2015/065567
§ 371 (c)(1),
(2) Date: Sep. 30, 2016

(87) PCT Pub. No.: WO2016/121142
PCT Pub. Date: Aug. 4, 2016

(65) Prior Publication Data
US 2017/0015818 A1 Jan. 19, 2017

(51) Int. Cl.
*C08J 9/00* (2006.01)
*C08L 1/02* (2006.01)
*B65D 81/38* (2006.01)
*C08J 9/12* (2006.01)
*C08J 9/34* (2006.01)
*C08L 53/02* (2006.01)

(52) U.S. Cl.
CPC ................ *C08L 1/02* (2013.01); *B65D 81/38* (2013.01); *B65D 81/3823* (2013.01); *C08J 9/0061* (2013.01); *C08J 9/0066* (2013.01); *C08J 9/125* (2013.01); *C08J 9/34* (2013.01); *C08J 2201/03* (2013.01); *C08J 2203/10* (2013.01); *C08J 2303/00* (2013.01); *C08J 2423/06* (2013.01); *C08J 2423/12* (2013.01); *C08J 2453/02* (2013.01); *C08J 2497/02* (2013.01); *C08L 53/025* (2013.01); *C08L 2205/03* (2013.01); *C08L 2205/035* (2013.01); *C08L 2205/08* (2013.01)

(58) Field of Classification Search
CPC ....................................................... C08J 9/0061
See application file for complete search history.

(56) References Cited

U.S. PATENT DOCUMENTS

2011/0100571 A1* 5/2011 Matsushita ........... B02C 15/004
162/28
2011/0244223 A1* 10/2011 Matsushita ............ B29O 44/22
428/336

FOREIGN PATENT DOCUMENTS

| JP | 3323481 | 6/2002 |
| JP | 2005-520010 | 7/2005 |
| JP | 2011-214371 | 10/2011 |
| JP | 2012-062467 | 3/2012 |
| JP | 2013-007030 | 1/2013 |
| JP | 2014-005416 | 1/2014 |
| JP | 2014-194004 | 10/2014 |

OTHER PUBLICATIONS

Korean Office Action dated Sep. 8, 2017, 12 pages.
International Search Report, dated Sep. 1, 2015 (Sep. 1, 2015).

* cited by examiner

*Primary Examiner* — Kara B Boyle
(74) *Attorney, Agent, or Firm* — Rankin, Hill & Clark, LLP

(57) ABSTRACT

Provided is a foamed product having excellent cold insulting effect as a heat insulating material or the like for cold insulation of a cold insulation container. The foamed product 1 includes a paper pellet of 50.0 to 70.0% by mass, a polypropylene resin group of 22.0 to 34.0% by mass, a low density polyethylene resin of 3.0 to 20.0% by mass, and a compatibilizing agent of 0.6 to 2.0% by mass of the polypropylene resin and the polyethylene resin. The paper pellet is formed by mixing fine paper powder of 30.0 to 50.0% by mass having a particle diameter of 30 to 200 μm and hydrophilic macromolecule of 50.0 to 70.0% by mass. The polypropylene resin group is composed of foamable polypropylene resin of 5.0 to 11.0% by mass and other polypropylene resin of 17 to 23% by mass.

10 Claims, 2 Drawing Sheets

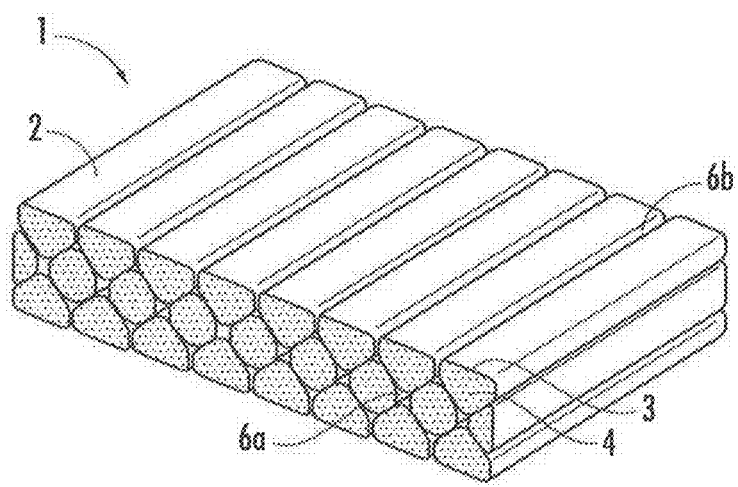
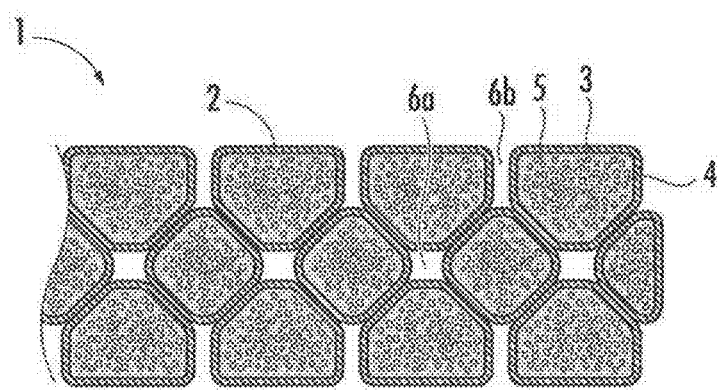

FOAMED PRODUCT

TECHNICAL FIELD

The present invention relates to a foamed product suitable for use as a heat insulating material or the like for cold insulation of a cold insulation container.

BACKGROUND ART

Currently, various types of foamed product and the like are used as heat insulating materials or the like for cold insulation of a cold insulation container. As such foamed products, for example, there is known a foamed product composed of paper powder component or plant powder component of 10 to 40% by weight, starch component of 25 to 40% by weight as auxiliary agent, and polypropylene component of 35 to 50% by weight (for example, refer to Patent Literature 1).

In such foamed product, used official postcards or used general paper is used for the paper powder component, and it is said that the foamed product can be incinerated as normal wastes after being used. Furthermore, by covering six internal surfaces of a box body such as a corrugated cardboard box or the like with the foamed product, a cold insulation space is obtained inside the box body, thereby enabling to obtain excellent cold insulating effect for the cold insulation space.

CITATION LIST

Patent Literature

Patent Literature 1: Japanese Patent No. 3323481

SUMMARY OF INVENTION

Problem to be Solved by the Invention

However, there are cases where sufficient cold insulating effect cannot be obtained by the foamed product recited in Patent Literature 1, and a foamed product having more excellent cold insulating effect is desired.

The present invention has been made in view of the above situation, and it is an object of the present invention to provide a foamed product having more excellent cold insulating effect as a heat insulating material for cold insulation or the like of a cold insulation container.

Solution to the Problem

In order to achieve the object, a foamed product of the present invention is a foamed product including: paper pellet of 50.0 to 70.0% by mass which is a mixture of fine paper powder and hydrophilic macromolecule; polypropylene resin group of 22.0 to 34.0% by mass including foamable polypropylene resin and other polypropylene resin; low density polyethylene resin of 3.0 to 20.0% by mass; and compatibilizing agent of the polypropylene resin and the polyethylene resin, the compatibilizing agent being 0.6 to 2.0% by mass, wherein the paper pellet is formed by mixing the fine paper powder of 30.0 to 50.0% by mass having a particle diameter of 30 to 200 µm and the hydrophilic macromolecule of 50.0 to 70.0% by mass, and the polypropylene resin group is composed of the foamable polypropylene resin of 5.0 to 11.0% by mass and said other polypropylene resin of 17 to 23% by mass.

The foamed product of the present invention can include as the raw material, the paper pellet, the polypropylene resin group, the low density polyethylene resin, and the compatibilizing agent of the polypropylene resin and the polyethylene resin (hereinafter simply abbreviated as "compatibilizing agent"). The raw material can be melted and kneaded in a cylinder of an extruder, and then water can be added for foam molding, thereby to obtain the foamed product.

The fine paper powder can be mixed with the hydrophilic macromolecule to obtain the paper pellet, thereby enabling to be mixed with the polypropylene resin group and the low density polyethylene resin. Furthermore, the polypropylene resin group and the low density polyethylene resin can be uniformly mixed by mixing under the presence of the compatibilizing agent.

At this time, since the foamed product of the present invention is foam molded by including the above mass range of the polypropylene resin group and the above mass range of the low density polyethylene resin, it is able to obtain excellent cold insulating effect compared to the conventional foamed product.

In the foamed product of the present invention, it becomes difficult to uniformly mix the polypropylene resin group and the low density polyethylene resin when the particle diameter of the fine paper powder exceeds 200 µm. Moreover, it is technically difficult to make the particle diameter of the fine paper powder to be less than 30 µm.

When the fine paper powder is less than 30% by mass with respect to the total amount of the paper pellet, the amount of the polypropylene resin group and the low density polyethylene resin cannot be sufficiently reduced, thereby the foamed product cannot be incinerated as normal wastes after being used. Moreover, when the fine paper powder exceeds 50.0% by mass with respect to the total amount of the paper pellet, the fine paper powder itself becomes difficult to be mixed with the polypropylene resin group and the low density polyethylene resin.

When the hydrophilic macromolecule is less than 50% by mass with respect to the total amount of the paper pellet, the proportion of paper would be excess when being formed as a pellet with the fine paper powder, which becomes a hindrance when mixing the paper pellet with the polypropylene resin group and the low density polyethylene resin. Moreover, when the hydrophilic macromolecule exceeds 70.0% by mass with respect to the total amount of the paper pellet, it becomes excess with respect to the above mass range of the fine paper powder, which becomes a hindrance when mixing the pellet with the polypropylene resin group and the low density polyethylene resin.

When the polypropylene resin group is less than 22.0% by mass, excellent cold insulating effect cannot be obtained when mixed with the above mass range of the low density polyethylene resin. Moreover, when the polypropylene resin group exceeds 34.0% by mass, it cannot be mixed with the above mass range of the low density polyethylene resin.

Here, the polypropylene resin group is composed of the foamable polypropylene resin of 5.0 to 11.0% by mass and other polypropylene resin of 17 to 23% by mass. When the foamable polypropylene resin is less than 5.0% by mass, it is difficult to obtain the foamed body. Moreover, when the foamable polypropylene resin exceeds 11.0% by mass, no further effect can be obtained.

The foamable polypropylene resin is a polypropylene resin formed with uniform and independent bubbles by having high melt tension and strain hardening property.

When the low density polyethylene resin is less than 3.0% by mass, excellent cold insulating effect cannot be obtained when mixed with the above mass range of the polypropylene resin group. Moreover, when the low density polyethylene resin exceeds 20.0% by mass, it cannot be mixed with the above mass range of the polypropylene resin group.

A low density polyethylene resin is defined by JIS K 6899-1:2000, and its density is defined by previous HS K6748:1995 as a polyethylene with density of 0.910 or more to less than 0.930.

When the compatibilizing agent is less than 0.6% by mass, the above mass range of the polypropylene resin group and the low density polyethylene resin cannot be mixed. Moreover, when the compatibilizing agent exceeds 2.0% by mass, mo further effect can be obtained.

The foamed product of the present invention is, for example, composed of a plurality of rod-like foamed products, wherein each of the rod-like foamed product has, on a surface thereof, a skin layer having no bubbles, and a foam layer covered by the skin layer and being formed inside the skin layer, and the surfaces of the skin layers are tightly connected to each other.

In the foamed product of the present invention, first, as being formed as the plurality of rod-like foamed products, a uniform foam layer having a predetermined length and a predetermined diameter can be formed. Moreover, in the foamed product of the present invention, since the plurality of rod-like foamed products are tightly connected to each other at the surfaces of the skin layers, excellent mechanical strength can be obtained. Moreover, as such, since the rod-like foamed product is formed to have the skin layer without bubbles covering the surface and contains the foam layer inside the skin layer, excellent thermal insulation performance can be obtained, and as a result, more excellent cold insulating effect compared to the conventional foamed product can be obtained.

According to the foamed product of the present invention, it is preferable that the paper pellet is 53.9 to 68.0% by mass, the polypropylene resin group is composed of the foamable polypropylene resin of 6.0 to 10.5% by mass and said other polypropylene resin of 17.9 to 22.0% by mass, and the total of the foamable polypropylene resin and said other polypropylene resin is 26.4 to 30.5% by mass, and the low density polyethylene resin is 4.0 to 16.0% by mass.

Moreover, according to the foamed product of the present invention, it is preferable that the compatibilizing agent is hydrogenated styrenic thermoplastic elastomer. As the hydrogenated styrenic thermoplastic elastomer, for example, hydrogenated styrene-ethylene-butylene-styrene block copolymer can be used (for example, ASAHI KASEI CHEMICALS Co., Product Name: Tuftec H1062).

Moreover, according to the foamed product of the present invention, it is preferable that 1.0 mass parts or less pigment is added with respect to 100 mass parts as a total of the paper pellet, the polypropylene resin group, the low density polyethylene resin, and the compatibilizing agent.

BRIEF DESCRIPTION OF DRAWINGS

FIG. 1 is an explanatory view illustrating a state where a part of a foamed product according to the present invention is cut out.

FIG. 2 is a partially enlarged schematic view of FIG. 1 illustrating a state of a cut surface.

DESCRIPTION OF EMBODIMENTS

Figure 3:
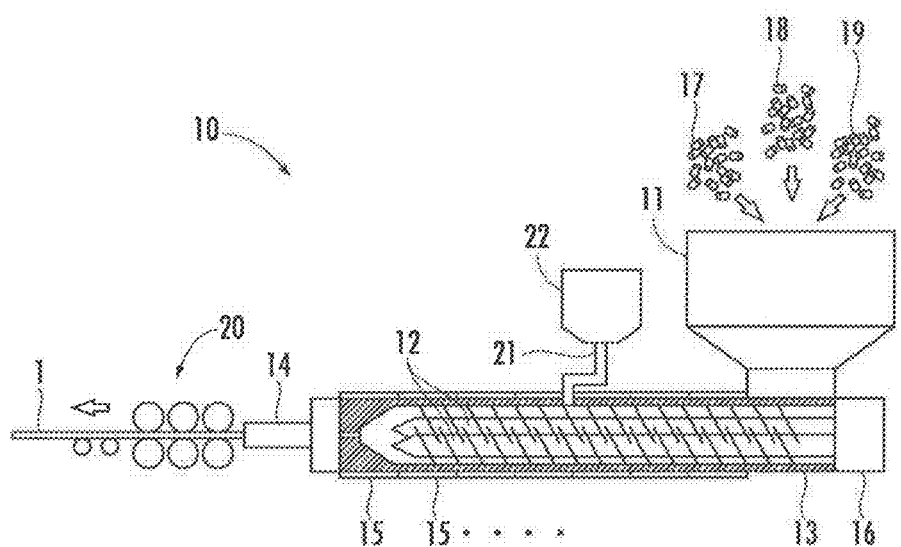
FIG. 3 is an explanatory view illustrating a manufacturing method of the foamed product of the present invention.

Next, an embodiment of the present invention with reference to the accompanying Figures is explained in details.

As shown in FIG. 1, a foamed product 1 of the present embodiment is a foamed product formed by connecting a plurality of rod-like elements 2 extending in an axial direction. The foamed product 1 of the present embodiment is actually 1 m in width, 1 m in length, and 30 mm in thickness, while FIG. 1 shows an enlarged view of a part of the foamed product.

Each rod-like element 2 has a two-layer structure of a skin layer 3 and a foam layer 4, as shown in FIG. 1 and FIG. 2. A large number of bubbles 5 exist in the foam layer 4. The rod-like elements 2 are in a state where skin layers 3 on their surfaces are tightly connected to each other. Moreover, there are voids 6a between each rod-like element 2, forming grooves fib on the surface of the foamed product 1, as shown in FIG. 1.

The foamed product 1 of the present embodiment is obtained by mixing a paper pellet of 50.0 to 70.0% by mass, preferably 53.9 to 68.0% by mass, a polypropylene resin group of 22.0 to 34.0% by mass, preferably 26.4 to 30.5% by mass, a low density polyethylene resin of 3.0 to 20.0% by mass, preferably 4.0 to 16.0% by mass, and a compatibilizing agent of the polypropylene resin and the polyethylene resin, the compatibilizing agent being 0.6 to 2.0% by mass, and by foam molding.

The paper pellet is a mixture of fine paper powder of 30.0 to 50.0% by mass having a particle diameter of 30 to 200 µm and a hydrophilic macromolecule of 50.0 to 70.0% by mass. The fine paper powder is mixed with the hydrophilic macromolecule in advance, thereby to form the paper pellet.

Here, as the fine paper powder, for example, waste sheet of roll paper or the like which has become industrial waste is coarsely grinded to about 2 mm square, and then finely grinded to 30 to 200 µm in particle diameter using a solid roller mill not shown. As the hydrophilic macromolecule, starch such as industrial starch or the like can be used.

The polypropylene resin group is composed of foamable polypropylene resin of 5.0 to 11.0% by mass, preferably 6.0 to 10.5% by mass, and other polypropylene resin of 17 to 23% by mass, for example, 17.9 to 22.0% by mass.

Moreover, the foamed product 1 may include additives such as a pigment, an antioxidant and a fungicide or the like. As the pigment, for example, white pigment such as titanium dioxide or the like may be used, and the white pigment may be mixed with the polyethylene resin to form a master batch. For example, the additives such as the pigment may be included in the paper pellet.

Next, a manufacturing method of the foamed product 1 of the present embodiment is explained with reference to FIG. 3.

An extruder 10 illustrated in FIG. 3 includes a hopper 11 into which the raw materials are charged and a cylinder 13 having biaxial screws 12 inside. A die 14 configured by a plurality of small openings is provided at a downstream end of the cylinder 13. Moreover, pluralities of heaters 15 for heating the inside of the cylinder 13 are arranged at the cylinder 13 in an axial direction of the cylinder 13. Further, a motor 16 for rotating the screws 12 is provided upstream of the cylinder 13.

In the present embodiment, first, paper pellet 17, polypropylene resin group pellet 18, low density polyethylene resin pellet 19, and compatibilizing agent (not illustrated) as the raw material are charged into the extruder 10 from the hopper 11. The supply amount of the raw material is adjusted by a raw material supply device (not illustrated), and charged into the hopper 11.

Here, the compatibilizing agent may be blended in either one of the polypropylene resin group pellet 18 or the low density polyethylene resin pellet 19 in advance, or may be charged independently.

The raw materials charged into the hopper 11 are supplied into the cylinder 13, and heated by the heaters 15 while being stirred by the two screws 12 in the cylinder 13, thereby being melt-mixed. In this state, the paper pellet 17, the polypropylene resin group pellet 18, and the low density polyethylene resin pellet 19, as the raw material are kneaded, so that the fine paper powder, the starch, the polypropylene resin group, the low density polyethylene resin, and the compatibilizing agent are mixed. At this time, the raw material in the cylinder 13 are melted by being heated by the heaters 15, and are conveyed downstream while being kneaded by the screws 12. As a result, a molten mixture of the fine paper powder, the starch, the polypropylene resin group, the low density polyethylene resin, and the compatibilizing agent is uniformly kneaded, and the fine paper powder is uniformly dispersed in the whole mixture.

Next, water stored in a water tank 22 is supplied to the inside of the cylinder 13 from the water supply line 21, thereby adding water to the melt-kneaded raw material. The added water is vaporized, thereby forming bubbles 5. The water can be added in a range of, for example, 2.0 to 10.0 mass parts with respect to the raw material of 100 mass parts.

Next, the raw material melt-kneaded in the cylinder 13 are pushed outside from the die 14 composed of a plurality of small openings, thereby forming a plurality of rod-like foamed products 2. When the melt-kneaded mixture of the row material is pushed out from the die 14 and released under atmospheric pressure, it is considered that the bubbles 5 inside expand, thereby extending the foamable polypropylene resin to foam. As a result, it is considered that the skin layer 3 and the foam layer 4 are formed in the rod-like foamed product 2.

Then when the skin layers 3 of the adjacent rod-like foamed products 2 contact with each other, since the raw material forming the skin layers 3 is still in a molten state immediately after pushed out from the die 14, the adjacent rod-like foamed products 2 are tightly connected to each other via the skin layers 3, thereby forming the foamed product 1.

A thickness adjustment roller 20 is provided downstream of the die 14 of the extruder 10. The thickness adjustment roller 20 adjusts the thickness of the foamed product 1 by a distance between metal rollers disposed on upper and lower sides and their elastic force pressing the foamed product 1 passing between the rollers.

Thereafter, the foamed product 1 is cooled while being adjusted to a constant thickness by the thickness adjustment roller 20, and conveyed downstream. The foamed product 1 is then cut to a desired length.

EXAMPLES

Next, Examples and Comparative Example of the present invention will be described.

Example 1

In Example 1, paper pellet of 68% by mass, polypropylene resin group of 26.4% by mass, low density polyethylene resin of 4.0% by mass (manufactured by Ube-Maruzen Polyethylene Co., Ltd., Product Name: L719), a compatibilizing agent 0.8% by mass (manufactured by ASAHI KASEI CHEMICALS Co., Product Name: H1062), and white pigment of 0.8% by mass (manufactured by TOYOCOLOR CO., Ltd., Product Name: High Concentration Titanium Oxide Master Batch TET 1TA538 WHT-FD) were used as the raw material. An extruder 10 illustrated in FIG. 3 was used in which water of 3.0% by mass with respect to the total amount of the raw material was added, and then the raw material was foam molded to produce the foamed product 1 illustrated in FIG. 1.

The paper pellet includes fine paper powder of 22.0% by mass having an average particle diameter of 100 μm and industrial starch of 46.0% by mass with respect to the total amount of the raw material.

Moreover, the polypropylene resin group includes foamable polypropylene resin of 8.5% by mass (manufactured by Japan Polypropylene Corporation, Product Name: NEW-FOAMER) and normal polypropylene resin of 17.9% by mass (manufactured by Japan Polypropylene Corporation, Product Name: FY-6).

Moreover, the white pigment is composed of titanium oxide of 70% by mass and low density polyethylene resin of 30% by mass with respect to the total amount of the white pigment.

As a result, the foamed product 1 of present Example 1 includes therein, the fine paper powder of 22% by mass, the industrial starch of 46% by mass, the polypropylene resin group of 26.4% by mass, the low density polyethylene resin of 4.0% by mass, the compatibilizing agent of 0.8% by mass, and the white pigment of 0.8% by mass.

Figure 4:
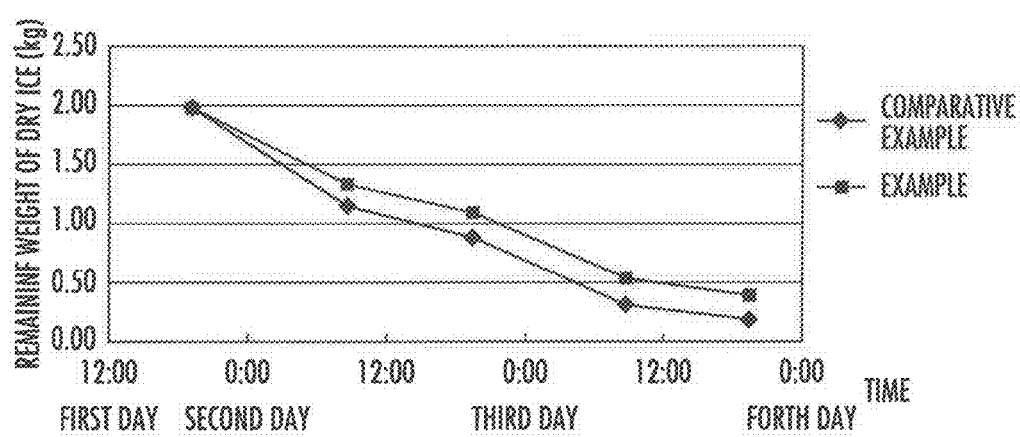
FIG. 4 is a graph illustrating a cold insulating effect of the foamed product of the present invention.

Next, a cold insulation container, in which the foamed product 1 obtained in the present Example 1 was arranged at six inner surfaces of a corrugated cardboard box having an inner dimension of 170 mm×149 mm×144 mm, was formed. Dry ice 2 kg was housed inside the cold insulation container and the temporal change of the remaining weight of the dry ice was measured. The results are shown in FIG. 4.

Example 2

In Example 2, paper pellet of 56.1% by mass, polypropylene resin group of 28.5% by mass, low density polyethylene resin of 14.6% by mass manufactured by Tosoh Corporation, Product Name: PETROCEN221), and compatibilizing agent of 0.8% by mass manufactured by ASAHI KASEI CHEMICALS Co., Product Name: Tuftec H1062) were used as the raw material. The extruder 10 illustrated in FIG. 3 was used in which water of 3.0% by mass with respect to the total amount of the raw material was added, and then the raw material was foam molded to produce the foamed product 1 illustrated in FIG. 1.

The paper pellet includes fine paper powder of 18.2% by mass having an average particle diameter of 100 μm and industrial starch of 37.9% by mass with respect to the total amount of the raw material. Here, the proportion of the fine paper powder is 32.3% by mass, and the proportion of the industrial starch is 67.7% by mass in the total amount of the paper pellet.

Moreover, the polypropylene resin group includes foamable polypropylene resin of 8.5% by mass (manufactured by Japan Polypropylene Corporation, Product Name: NEW-FOAMER) and normal polypropylene resin of 20.0% by mass (manufactured by Japan Polypropylene Corporation, Product Name: VS700).

As a result, the foamed product 1 of the present Example includes therein, the fine paper powder of 18.2% by mass, the industrial starch of 37.9% by mass, the polypropylene resin group of 28.5% by mass, the low density polyethylene resin of 14.6% by mass, and the compatibilizing agent of 0.8% by mass.

Next, a cold insulation container, in which the foamed product 1 obtained in Example 2 was arranged at six inner surfaces of a corrugated cardboard box having an inner dimension of 170 mm×149 mm×144 mm, was formed. Dry ice 2 kg was housed inside the cold insulation container and the temporal change of the remaining weight of the dry ice was measured. The same performance as the foamed product 1 of Example 1 was able to be obtained.

Example 3

In Example 3, paper pellet of 53.9% by MSS, polypropylene resin group of 30.5% by mass, low density polyethylene resin of 14.0% by mass (manufactured by Ube-Maruzen Polyethylene Co., Ltd., Product Name: L719), and compatibilizing agent of 0.8% by mass (manufactured by ASAHI KASEI CHEMICALS Co., Product Name: Tuftec H1062), and white pigment of 0.8% by mass (manufactured by TOYOCOLOR CO., Ltd., Product Name: High Concentration Titanium Oxide Master Batch TET ITA538 WHT-FD) were used as the raw material. The extruder 10 illustrated in FIG. 3 was used in which water of 3.0% by mass with respect to the total amount of the raw material was added, and then the raw material was foam molded to produce the foamed product 1 illustrated in FIG. 1.

The paper pellet includes fine paper powder of 17.5% by mass having an average particle diameter of 100 μm and industrial starch of 36.4% by mass with respect to the total amount of the raw material. Here, the proportion of the fine paper powder is 32.4% by mass, and the proportion of the industrial starch is 67.6% by mass in the total amount of the paper pellet.

Moreover, the polypropylene resin group includes foamable polypropylene resin of 10.5% by mass (manufactured by Japan Polypropylene Corporation, Product Name: NEW-FOAMER) and normal polypropylene resin of 20.0% by mass (manufactured by Japan Polypropylene Corporation, Product Name: FY-6).

As a result, the foamed product 1 of Example 3 includes therein, the fine paper powder of 17.5% by mass, the industrial starch of 36.4% by mass, the polypropylene resin group of 30.5% by mass, the low density polyethylene resin of 14.0% by mass, the compatibilizing agent of 0.8% by mass, and the white pigment of 0.8% by mass.

Next, a cold insulation container, in which the foamed product 1 obtained in Example 3 was arranged at six inner surfaces of a corrugated cardboard box having an inner dimension of 170 mm×149 mm×144 mm, was formed. Dry ice 2 kg was housed inside the cold insulation container and the temporal change of the remaining weight of the dry ice was measured. The same performance as the foamed product 1 of Example 1 was able to be obtained.

Example 4

In Example 4, paper pellet of 54.4% by mass, polypropylene resin group of 28.0% by mass, low density polyethylene resin of 16.0% by mass manufactured by Ube-Maruzen Polyethylene Co., Ltd., Product Name: L719), and compatibilizing agent of 0.8% by mass (manufactured by ASAHI KASEI CHEMICALS Co., Product Name: Tuftec H1062), and white pigment of 0.8% by mass (manufactured by TOYOCOLOR CO., Ltd., Product Name: High Concentration Titanium Oxide Master Batch TET 1TA538 WHT-FE) were used as the raw material. The extruder 10 illustrated in FIG. 3 was used in which water of 3.0% by mass with respect to the total amount of the raw material was added, and then the raw material was foam molded to produce the foamed product 1 illustrated in FIG. 1.

The paper pellet includes fine paper powder of 17.6% by mass having an average particle diameter of 100 μm and industrial starch of 36.8% by mass with respect to the total amount of the raw material. Here, the proportion of the fine paper powder is 32.4% by mass, and the proportion of the industrial starch is 67.6% by mass in the total amount of the paper pellet.

Moreover, the polypropylene resin group includes foamable polypropylene resin of 6.0% by mass (manufactured by Japan Polypropylene Corporation, Product Name: NEW-FOAMER) and normal polypropylene resin of 22.0% by mass (manufactured by Japan Polypropylene Corporation, Product Name: FY-6).

As a result, the foamed product 1 of Example 4 includes therein, the fine paper powder of 17.6% by mass, the industrial starch of 36.8% by mass, the polypropylene resin group of 28.0% by mass, the low density polyethylene resin of 16.0% by mass, the compatibilizing agent of 0.8% by mass, and the white pigment of 0.8% by mass.

Next, a cold insulation container, in which the foamed product 1 obtained in Example 4 was arranged at six inner surfaces of a corrugated cardboard box having an inner dimension of 170 mm×149 mm×144 mm, was formed. Dry ice 2 kg was housed inside the cold insulation container and the temporal change of the remaining weight of the dry ice was measured. The same performance as the foamed product 1 of Example 1 was able to be obtained.

Comparative Example

In the present Comparative Example, the conditions such as the dimension of the foamed product or the like were the same as Example 1 except that commercially available foamed product which is the worked product of Patent Literature 1 was used, and the temporal change of the remaining weight of the dry ice was measured.

According to Patent Literature 1, paper powder component of 24% by weight having particle diameters of approximately 150 to 80 μm, starch component of 36% by weight, and polypropylene resin component of 40% by weight were suitably supplied with water and well kneaded by a kneading machine, and charged into an extruder, thereby to be foamed. The result is shown in FIG. 4.

From FIG. 4, the remaining weight of the dry ice after 52 hours and 15 minutes from the start of the measurement was 0.39 kg in the cold insulation container using the foamed product 1 of Example 1, whereas the remaining weight was 0.19 kg in the cold insulation container using the commercially available foamed product of the Comparative Example. Therefore, over two times dry ice remained in the cold insulation container of the present Example compared to the cold insulation container of the Comparative Example. Accordingly, it is clear that the foamed product 1 of the present invention has excellent cold insulating performance.

REFERENCE SIGNS LIST

1 . . . foamed product, 2 . . . rod-like element, 3 . . . skin layer, 4 . . . foam layer, 5 . . . bubble, 6*a* . . . void, 6*b* . . . groove

The invention claimed is:

1. A foamed product obtained by foam molding of raw material, the raw material comprising:
   paper pellet in an amount of 50.0 to 70.0% by mass of the raw material, the paper pellet being a mixture of fine paper powder and hydrophilic macromolecule;
   polypropylene resin group in an amount of 22.0 to 34.0% by mass of the raw material, the polypropylene resin group being composed of foamable polypropylene resin and other polypropylene resin;
   low density polyethylene resin in an amount of 3.0 to 20.0% by mass of the raw material; and
   compatibilizing agent of the polypropylene resin and the polyethylene resin, the compatibilizing agent provided in an amount of 0.6 to 2.0% by mass of the raw material,
   wherein the paper pellet is formed by mixing the fine paper powder in an amount of 30.0 to 50.0% by mass of the paper pellet, the fine paper powder having a particle diameter of 30 to 200 μm, and the hydrophilic macromolecule in an amount of 50.0 to 70.0% by mass of the paper pellet, and
   wherein the polypropylene resin group is composed of the foamable polypropylene resin in an amount of 5.0 to 11.0% by mass of the raw material, and said other polypropylene resin of 17 to 23% by mass of the raw material.

2. The foamed product according to claim 1, wherein
   the paper pellet is provided in an amount of 53.9 to 68.0% by mass of the raw material,
   the polypropylene resin group is composed of the foamable polypropylene resin in an amount of 6.0 to 10.5% by mass of the raw material, and said other polypropylene resin in an amount of 17.9 to 22.0% by mass of the raw material, and a total of the foamable polypropylene resin and said other polypropylene resin is in an amount of 26.4 to 30.5% by mass of the raw material, and
   the low density polyethylene resin is provided in an amount of 4.0 to 16.0% by mass of the raw material.

3. The foamed product according to claim 1, wherein the compatibilizing agent is hydrogenated styrenic thermoplastic elastomer.

4. The foamed product according to claim 3, wherein the hydrogenated styrenic thermoplastic elastomer is hydrogenated styrene-ethylene-butylene-styrene block copolymer.

5. The foamed product according to claim 1, wherein 1.0 mass parts or less pigment is added with respect to 100 mass parts as a total of the paper pellet, the polypropylene resin group, the low density polyethylene resin, and the compatibilizing agent.

6. A foamed product comprising:
   fine paper powder having a particle diameter of 30 to 200 μm, in an amount of 15.0 to 35.0% by mass of the foamed product;
   hydrophilic macromolecule in an amount of 25.0 to 49.0% by mass of the foamed product;
   polypropylene resin group in an amount of 22.0 to 34.0% by mass of the foamed product, the polypropylene resin group being composed of a foamable polypropylene resin and other polypropylene resin;
   low density polyethylene resin in an amount of 3.0 to 20.0% by mass of the foamed product; and
   compatibilizing agent of the polypropylene resin and the polyethylene resin, the compatibilizing agent being provided in an amount of 0.6 to 2.0% by mass of the foamed product,
   wherein the polypropylene resin group is composed of the foamable polypropylene resin in an amount of 5.0 to 11.0% by mass of the foamed product, and said other polypropylene resin in an amount of 17 to 23% by mass of the foamed product.

7. The foamed product according to claim 6, wherein
   the fine paper powder is provided in an amount of 16.2 to 34.0% by mass of the foamed product;
   the hydrophilic macromolecule is provided in an amount of 26.95 to 47.6% by mass of the foamed product;
   the polypropylene resin group is composed of the foamable polypropylene resin in an amount of 6.0 to 10.5% by mass of the foamed product, and said other polypropylene resin in an amount of 17.9 to 22% by mass of the foamed product, and a total of the foamable polypropylene resin and said other polypropylene resin is in an amount of 26.4 to 30.5% by mass of the foamed product; and
   the low density polyethylene resin is provided in an amount of 4.0 to 16.0% by mass of the foamed product.

8. The foamed product according to claim 6, wherein the compatibilizing agent is hydrogenated styrenic thermoplastic elastomer.

9. The foamed product according to claim 8, wherein the hydrogenated styrenic thermoplastic elastomer is hydrogenated styrene-ethylene-butylene-styrene block copolymer.

10. The foamed product according to claim 6, wherein 1.0 mass parts or less pigment is added with respect to 100 mass parts as a total of the fine paper powder, the hydrophilic macromolecule, the polypropylene resin group, the low density polyethylene resin, and the compatibilizing agent.

* * * * *